No. 724,578. PATENTED APR. 7, 1903.
H. H. HUNGERFORD.
MACHINE FOR CUTTING WAFERS OR THE LIKE.
APPLICATION FILED NOV. 7, 1901.
NO MODEL. 2 SHEETS—SHEET 1.
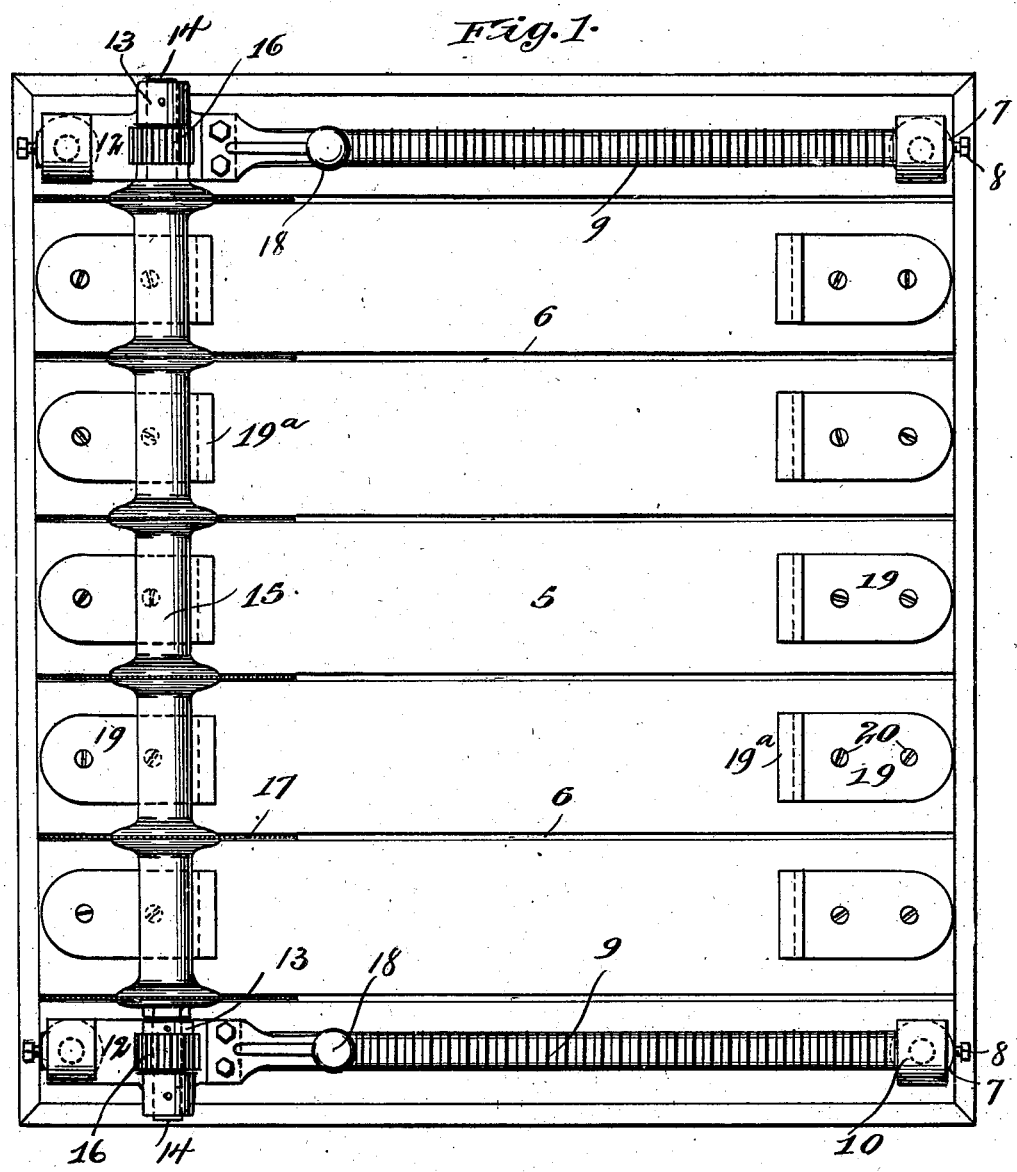
Witnesses,
J. S. Mann,
S. N. Pond.
Inventor,
Henry H. Hungerford
By Offield, Towle & Linthicum
Attys.

No. 724,578. PATENTED APR. 7, 1903.
H. H. HUNGERFORD.
MACHINE FOR CUTTING WAFERS OR THE LIKE.
APPLICATION FILED NOV. 7, 1901.
NO MODEL. 2 SHEETS—SHEET 2.
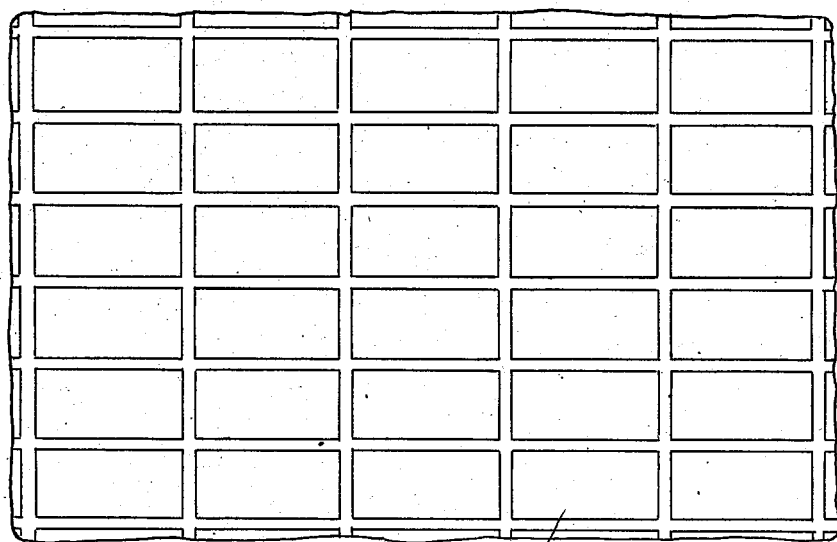
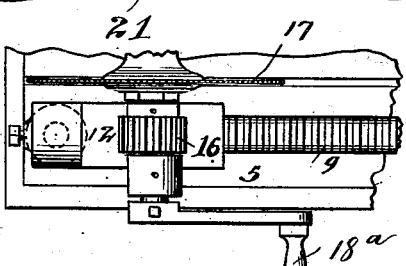
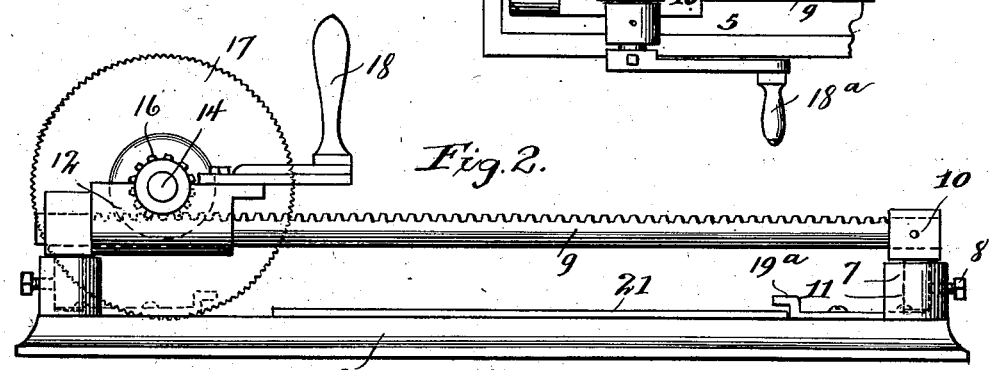
Witnesses, Inventor,
Henry H. Hungerford

UNITED STATES PATENT OFFICE.

HENRY H. HUNGERFORD, OF CHICAGO, ILLINOIS, ASSIGNOR TO FRANK M. PETERS, OF CHICAGO, ILLINOIS.

MACHINE FOR CUTTING WAFERS OR THE LIKE.

SPECIFICATION forming part of Letters Patent No. 724,578, dated April 7, 1903.

Application filed November 7, 1901. Serial No. 81,389. (No model.)

*To all whom it may concern:*

Be it known that I, HENRY H. HUNGERFORD, a citizen of the United States, residing at Chicago, in the county of Cook and State of Illinois, have invented certain new and useful Improvements in Machines for Cutting Wafers or the Like, of which the following is a specification.

My invention relates to a machine for cutting and trimming sheets of wafers, thin crackers, and similar brittle bakery products, the principal object of the machine being to cut and divide the sheet of material operated upon into a number of strips or forms of predetermined size.

In the manufacture of many kinds of bakery products, and notably those varieties of a delicate and more or less brittle texture, such as sugar-wafers and the like, the sheet or sheets constituting the body of the wafer or cracker is cut to form the individual wafers. Hitherto, so far as I am aware, this has usually been done by hand. This method has, however, proved unreliable, for the reason that owing to the exceedingly delicate and brittle texture of the product the cuts would not always be clean nor in equidistant and uniform lines, and this obviously is objectionable. My present invention, therefore, is the result of a search to find a reliable mechanism for quickly, accurately, cheaply, and neatly cutting these sheets or strips of wafers and like goods into the desired strips or forms without any waste of the goods resulting from their breakage in the process of separation and by a simple hand-manipulated apparatus.

To this end the essential and distinguishing characteristics of my invention reside in a grooved table or base-plate having a superficial area sufficient to receive and support the sheet or sheets to be divided and a rotatable shaft carrying a series of suitably-spaced rotary cutters thereon supported at a suitable height above said table or base-plate and adapted to be reciprocated thereover in a direction transversely of the shaft and means for effecting the rotation of the shaft and its cutters simultaneously with its laterally-reciprocating travel.

A preferred embodiment of my invention is illustrated in the drawings accompanying this application, in which—

Figure 1 is a top plan view of a machine in which my present improvements are incorporated. Fig. 2 is a side elevation thereof. Fig. 3 is a detail in vertical transverse section, illustrating the coöperation of the saws or cutters with the grooves of the bed-plate. Fig. 4 is a detail illustrating a modification of the means for moving the cutter-shaft and cutters, and Fig. 5 is a plan view of a typical sheet of wafers or like material to be operated upon by the machine.

In carrying out my invention I provide a suitable base-plate 5, preferably of the rectangular form shown and of a size sufficient to support thereon the operating parts of the machine and the sheet or sheets of material operated upon. The bed-plate is provided on its upper face with a series of parallel grooves 6, extending, preferably, entirely across the same in one direction thereof. At each corner of the bed-plate is located a hollow standard 7, provided with a set-screw 8, tapping the same laterally. A pair of rack-bars 9, supported at their opposite ends in blocks 10, extend above and between the two standards at each side of the bed-plate, respectively. Each block 10 is provided with a depending stem 11 of a length and diameter sufficient to enable it to slide freely within its containing standard 7, it being adjustable therein to any desired height within the limit of its length by means of the set-screw 8.

On each of the rack-bars 9 is mounted a bearing-block 12, this latter having a sliding fit on the rack-bar, and the two blocks containing journal-bearings 13, which receive the end journals 14 of a horizontal shaft 15, extending between and slightly above the rack-bars 9. Each journal 14 of the shaft has keyed thereon a driving-pinion 16, this latter intermeshing the teeth of its underlying rack-bar 9. The shaft 15 is further provided with a series of cutters or circular saws 17, spaced at intervals corresponding to the intervals between the grooves 6 of the base-plate and disposed at such a height as to cause the periphery of the cutters in their lowermost position to enter the grooves, as plainly shown in Fig. 3. The cutters 17 may be secured fast on the shaft 15 in any suitable or desired manner, so as to partake of the rotation thereof. The bearing-blocks 12 have secured thereon a pair of upstanding handles 18, which are designed to be gripped by the hands of the attendant in operating the machine, as hereinafter more particularly described. It will be evident that as an equivalent means for moving the shaft and cutters across the bed-plate a crank 18$^a$ might be applied to the end 14 of the shaft 15, as shown in the modification illustrated in Fig. 4.

The upper face of the base-plate has preferably secured thereon along its front and rear margins and between the several grooves 6 therein two series of stops 19, these latter being preferably simply screwed to the base-plate, as shown at 20, and at their inner ends provided with overhanging and inwardly-extending flanges or lips 19$^a$ for the purpose of vertically confining the abutting edge of the material operated upon.

The operation of the machine in cutting a sheet or series of sheets of wafers or the like will be readily seen from the foregoing description, but may be briefly set forth as follows: The parts of the machine being in the positions indicated in Fig. 1, the material operated upon, 21, such as is indicated in Fig. 5, is laid flat upon the base-plate and with one edge abutting the series of stops 19, as clearly shown in Fig. 2. The sheet of material having been properly positioned, the attendant grasps the handles 18 and draws the bearing-blocks 12 and their contained mechanism toward himself across the entire width of the base-plate or until the bearing-blocks abut the stationary blocks 10 at the right or inner side of the base-plate. This bodily travel of the shaft 15 across the base-plate through the rack-and-pinion mechanism described produces at the same time an axial rotation of the shaft and the cutters carried thereby, which rotation of the cutters is effective to cut and separate the sheet of material operated upon into a series of longitudinal strips. In case it should be desired to then cut these strips transversely they may be subsequently subjected to the action of another cutting-machine precisely similar to that already described, excepting that the grooves of its base-plate and its rotary cutters will be spaced at intervals corresponding to the desired dimensions. The next sheet or stack of sheets will be laid in place on the base-plate, with its right-hand edge abutting the right-hand series of stops as the machine is positioned in Figs. 1 and 2, and the cutting of this sheet will be effected by the operator by returning the shaft 15 and its cutters through a pushing movement to the position shown in the drawings. In this way each successive travel of the cutter-shaft across the base-plate may be made effective to cut a strip of material, in which operation the two series of stops on opposite sides of the base-plate are alternately brought into use.

Where a crank, such as 18$^a$, is employed to move the shaft and cutters, these movements will be effected in an obvious manner by turning the crank in one direction or the other, according to the desired direction of travel of the shaft.

The provision of the grooves 6 in the bed-plate receiving the teeth of the saws in the lowermost arc of their travel insures the complete cutting through of the material operated upon and the correspondingly complete separation of the strips into which it is divided by the action of the machine. At the same time the sheet of material subjected to the action of the saws is firmly supported by the base-plate at all points except along the intended lines of separation.

It will be obvious that my invention in its useful applications is not limited to its operation upon bakery products such as I have described, although it has been designed more especially for application to the latter and will undoubtedly find its chief utility in connection therewith. It might, however, be usefully employed in the cutting of other brittle substances. It is also obvious that a stack of sheets may be operated upon at one time or filled sheets, such as are known as "sugar-wafers," and it is also apparent that when the sheet is divided into strips, as before mentioned, the strips thus produced may be superposed one upon the other and the entire stack cut transversely at one operation. It will also be obvious that the specific details of the machine hereinabove described might be considerably varied without departing from the principle and spirit of the invention. I do not, therefore, limit myself in the mechanical embodiment of my invention to the specific details of construction and arrangement of parts herein shown and described except in so far as they may be made the subject of specific claims.

I claim—

1. In a machine for cutting wafers and the like, from sheets of material employed in the manufacture thereof, the combination with a grooved support for the sheets, of a cutter-shaft mounted transversely above said support, and a series of cutters carried thereby, the peripheries of which enter said grooves, means for imparting a bodily movement of said shaft and its cutters across such support, and gearing for imparting to said cutters simultaneously with their bodily movement a positive rotation the peripheral speed of which is greater than the speed of travel of the shaft, whereby to produce a draw cut of the cutters in the grooves, substantially as described.

2. In a machine of the character described the combination with a base-plate having a series of parallel grooves, means for holding sheets of material in position upon the base-plate over said grooves, rack-bars arranged parallel with said grooves, and a cutter-shaft having pinions engaged with the rack-bar, a series of cutters carried by the shaft and having their peripheries entering said grooves, means for causing the travel of the cutter-shaft and cutters across the base-plate, the peripheral speed of the cutters being greater than the speed of travel of the cutter-shaft, thereby producing a draw cut of the cutters within the grooves substantially as described.

HENRY H. HUNGERFORD.

Witnesses:
SAMUEL N. POND,
VINCENT J. WALSH.